Patented June 20, 1944

2,351,585

UNITED STATES PATENT OFFICE 2,351,585

THERMOFLUID PRINTING INK

Frank G. Breyer, Wilton, Conn., assignor to J. M. Huber, Inc., New York, N. Y., a corporation of New Jersey No Drawing. Application July 11, 1940, Serial No. 344,847

4 Claims. (Cl. 260—23)

This invention relates to new and improved thermo-fluid printing inks for use with the "Cold set" printing process disclosed in a copending application of Walter Huber, filed August 3, 1939, now United States Patent No. 2,268,594.

The object of this invention is to provide new thermo-fluid printing inks which can be used to advantage for the printing of newspapers, magazines and other literature at high printing speeds according to said process, particularly as set forth in my copending application, filed of even date herewith, now United States Patent No. 2,329,152.

The printing inks of my present invention are characterized by the following qualities: At ordinary temperatures they are solid, hard and free from objectionable tack or stickiness; they melt in ranges of temperatures above about 155°; when thin films of the molten ink are cooled suddenly they possess a greater hardness and gloss than when cooled slowly; they are free from objectionable thixotropy, or "false body," when molten; at temperatures above their melting ranges they have a much lower viscosity than other inks of comparable type, yet the molten ink is cohesive and adheres evenly to letter-press printing surfaces without "flying" from the press at high printing speeds, and films of the molten ink part readily from the heated printing surfaces when they touch the paper or other stock; they can be printed successfully on high speed rotary letter-presses at web speeds of 600 to 1500 feet per minute and at temperatures well above 210° F.; and when so printed in thin films they lie properly on the stock, adhere thereto and solidify immediately by loss of heat into the stock.

I have found that thermo-fluid printing inks possessing these and other desirable qualities can be obtained by incorporating coloring pigments in solid vehicles containing hard thermoplastic resin as a principal ingredient, together with a minor proportion of hydrogenated soya bean oil or the like and not more than a small amount of hard wax. The hard resin ingredient preferably consists mainly of cumarone resin, such as Cumar V, and a smaller proportion of gilsonite. The hard wax can be carnauba wax, candelilla wax, montan wax or the like. The gilsonite imparts "length" and freedom from "false body" to the molten ink, while the cumarone imparts toughness, hardness and the like. With these ingredients the hydrogenated soya bean oil and wax cooperate to produce the desired fluidity, freedom from tack and other printing qualities mentioned hereinabove.

The content of cumarone resin may be substituted entirely or in part by hard rosins and rosin derivatives, such as wood rosin, hydrogenated rosin ester gum, limed rosin, etc., which are likewise thermo-plastic and similar to cumarone in their hardness and toughness qualities.

Particularly valuable printing inks embodying my present invention are made with a solid vehicle containing about 25 to 40% of Cumar V, about 15 to 30% of gilsonite, about 30 to 45% of hydrogenated soya bean oil (soya bean stearin) and less than 15% of carnauba wax. The content of Cumar should be greater than the content of gilsonite, and the resin content (cumarone and gilsonite) should be greater than the content of hydrogenated soya bean oil. Inks of various colors are obtained by combining such a vehicle with appropriate amounts and types of coloring pigments. The following specific examples are illustrative:

Example I—Black printing ink

| | Parts by weight |
|---|---|
| "Cumar V-2½" | 31 |
| Gilsonite | 23 |
| Hydrogenated soya bean oil | 35 |
| Carnauba wax | 11 |
| Total vehicle | 100 |
| Carbon black | 9 |
| Total ink | 109 |

Example II—Black printing ink

| | Parts by weight |
|---|---|
| "Cumar V-2½" | 28 |
| Gilsonite | 21 |
| Hydrogenated soya bean oil | 40.5 |
| Carnauba wax | 10.5 |
| Total vehicle | 100.0 |
| Carbon black | 11.6 |
| Total ink | 111.6 |

Melting range (drop method): 72°–74° C.
Viscosity: At 250° F., 1.5 poises; 230° F., 2.1 poises; 210° F., 3.2 poises (Brookfield "synchrolectric" viscosimeter).

*Example III—Yellow printing ink*

| | Parts by weight |
|---|---|
| Vehicle (same as in II) | 70 |
| Chrome yellow | 27 |
| Rex orange (Pb molybdate) | 3 |
| Total ink | 100 |

Melting range: 72°–74° C.
Viscosity: At 250° F., 1.7 poises; 230° F., 2.6 poises; 210° F., 4.3 poises.

*Example IV—Red printing ink*

| | Parts by weight |
|---|---|
| Vehicle (same as in II) | 89 |
| Fire red toner | 8 |
| Chrome orange | 4 |
| Total ink | 101 |

Melting range: 73°–74° C.
Viscosity: At 250° F., 1.4 poises; 230° F., 1.9 poises; 210° F., 2.9 poises.

*Example V—Green printing ink*

| | Parts by weight |
|---|---|
| Vehicle (same as in II) | 68 |
| Chrome yellow | 30 |
| Carbon black | 1 |
| Milori blue | 1 |
| Total ink | 100 |

Melting range: 74°–75° C.
Viscosity: At 250° F., 2.5 poises; 230° F., 3.3 poises; 210° F., 5.6 poises.

In compounding these inks, the highest melting resin is usually melted first in a suitably heated container, after which the lower-melting resin (gilsonite), the hydrogenated soya bean oil and the wax, in the order named, are stirred in to form a homogeneous body of hot liquid vehicle. The pigment is then added and stirred into this molten vehicle, after which the mixture is ground repeatedly in a suitably heated grinding mill or mills. When ground, the molten ink is poured into containers and allowed to cool.

Printing operations are carried out with the new inks at printing temperatures between about 210° and 250° F., at which the inks possess an exceedingly low viscosity and other qualities desired for high speed newspaper printing and the like according to the disclosure of my aforesaid copending application. The viscosity of these inks when printed is generally less than 10 poises, whereas the viscosity of ordinary liquid newspaper printing inks generally exceeds 30 poises at room temperatures. The new inks retain their thermo-fluid characteristics after repeated melting and cooling operations, and they are free from volatile solvents and other common printing ink constituents that would cause changes in their consistency to take place from time to time.

The utility of my present invention is not restricted to any particular kind of printing work, nor is the invention restricted to the illustrative examples or other details of disclosure set forth hereinabove, except as may be required by a fair construction of the appended claims.

I claim:

1. Thermo-fluid printing ink consisting of coloring pigment incorporated in a normally solid vehicle, at least 85% of said vehicle consisting of about 25 to 40% of hard thermo-plastic cumarone resin, about 15 to 30% of gilsonite and about 30 to 45% of hydrogenated soya bean oil.

2. Thermo-fluid printing ink consisting of coloring pigment incorporated in a normally solid vehicle composed substantially entirely of about 25 to 40% of hard thermo-plastic cumarone resin, about 15 to 30% of gilsonite, about 30 to 45% of hydrogenated soya bean oil and an appreciable proportion but less than 15% of hard wax.

3. Thermo-fluid printing ink consisting of coloring material incorporated in a normally solid vehicle containing about 30% of hard thermo-plastic cumarone resin, about 20% of gilsonite, about 40% of hydrogenated soya bean oil and about 10% of carnauba wax.

4. Thermo-fluid printing ink consisting of coloring material incorporated in a normally solid vehicle composed substantially entirely, by weight, of an appreciable proportion less than 15% of hard waxy material, 15 to 30% of gilsonite, 30 to 45% of normally solid hydrogenated vegetable oil and 25 to 40% of hard thermo-plastic resin other than gilsonite, the content of said resin exceeding the content of gilsonite and the combined contents of said resin and gilsonite exceeding the content of hydrogenated oil.

FRANK G. BREYER.